United States Patent
Hofström et al.

(10) Patent No.: US 10,673,569 B2
(45) Date of Patent: Jun. 2, 2020

(54) METHODS AND ARRANGEMENTS FOR MANAGING A RETRANSMISSION BY A DEVICE ON A RANDOM ACCESS CHANNEL IN A WIRELESS COMMUNICATION NETWORK

(71) Applicant: Telefonaktiebolaget LM Ericsson (publ), Stockholm (SE)

(72) Inventors: Björn Hofström, Linköping (SE); John Walter Diachina, Garner, NC (US); Nicklas Johansson, Brokind (SE); Claes-Göran Persson, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 78 days.

(21) Appl. No.: 15/768,144

(22) PCT Filed: Nov. 1, 2016

(86) PCT No.: PCT/SE2016/051073
§ 371 (c)(1),
(2) Date: Apr. 13, 2018

(87) PCT Pub. No.: WO2017/082798
PCT Pub. Date: May 18, 2017

(65) Prior Publication Data
US 2018/0302190 A1    Oct. 18, 2018

Related U.S. Application Data

(60) Provisional application No. 62/252,712, filed on Nov. 9, 2015.

(51) Int. Cl.
*H04L 1/08* (2006.01)
*H04L 1/18* (2006.01)
*H04W 74/08* (2009.01)

(52) U.S. Cl.
CPC ............. *H04L 1/08* (2013.01); *H04L 1/188* (2013.01); *H04W 74/0833* (2013.01)

(58) Field of Classification Search
CPC .................................................. H04L 1/1809
(Continued)

(56) References Cited

U.S. PATENT DOCUMENTS

2007/0025388 A1    2/2007  Abhishek et al.
2008/0259861 A1*  10/2008  Kang .................... H04W 52/50
                                                            370/329

(Continued)

FOREIGN PATENT DOCUMENTS

RU    2011114088 A    10/2012
WO    2009036389 A2    3/2009
(Continued)

OTHER PUBLICATIONS

"3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.0.0, Aug. 2015, pp. 1-495.
(Continued)

*Primary Examiner* — Fritz Alphonse
(74) *Attorney, Agent, or Firm* — Murphy, Bilak & Homiller, PLLC

(57) ABSTRACT

Methods and arrangements for managing a retransmission on a Random Access CHannel, "RACH", in a wireless communication network (100). A device (600; 120) performs (404; 502) the retransmission on the RACH, wherein the retransmission is based on a coverage class associated with the device (600; 120). Basing the retransmission on the coverage class e.g. enables reduction of retransmission collisions when the wireless communication network (100) operates as in Extended Coverage GSM, "EC-GSM".

18 Claims, 7 Drawing Sheets

(58) Field of Classification Search
USPC .................................... 714/748, 751, 746
See application file for complete search history.

(56) References Cited

U.S. PATENT DOCUMENTS

| | | | |
|---|---|---|---|
| 2011/0317636 | A1 | 12/2011 | Diachina et al. |
| 2014/0016573 | A1* | 1/2014 | Nuggehalli ............ H01Q 1/242 370/329 |
| 2015/0173105 | A1* | 6/2015 | Bergstrom .......... H04W 74/006 370/329 |
| 2016/0338032 | A1* | 11/2016 | Wang ...................... H04W 4/70 |
| 2017/0215197 | A1* | 7/2017 | Sagong ............. H04W 72/0413 |
| 2018/0077696 | A1* | 3/2018 | Lee ........................ H04W 72/02 |
| 2018/0295612 | A1* | 10/2018 | Yi ............................. H04B 7/26 |

FOREIGN PATENT DOCUMENTS

| | | |
|---|---|---|
| WO | 2012016538 A1 | 2/2012 |
| WO | 2014025300 A1 | 2/2014 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.6.0, Jun. 2015, pp. 1-77.

"3GPP TS 44.018 V12.6.0 (Jun. 2015)", 3rd Generation Partnership Project; Technical Specification Group GSM/EDGE Radio Access Network; Mobile radio interface layer 3 specification; Radio Resource Control (RRC) protocol (Release 12), Jun. 2015, pp. 1-204.

"Email discussion report on [91#24][LTE/MTC] Timer handling for extended coverage", 3GPP TSG-RAN WG2 #91 bis, Tdoc R2-154870, Malmo, Sweden, Oct. 5-9, 2015, pp. 1-27.

"New Work Item on Extended Coverage GSM (EC-GSM) for support of Cellular Internet of Things", 3GPP TSG GERAN#67, GP-151039, Yinchuan, P.R. China, Aug. 10-14, 2015, pp. 1-7.

* cited by examiner

METHODS AND ARRANGEMENTS FOR MANAGING A RETRANSMISSION BY A DEVICE ON A RANDOM ACCESS CHANNEL IN A WIRELESS COMMUNICATION NETWORK

TECHNICAL FIELD

Embodiments herein relate to methods and nodes in a wireless communication network, e.g. telecommunication network, for managing a retransmission by a wireless device on a Random Access CHannel (RACH) in a wireless communication network.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. a device that is not necessarily associated with a conventional user, such as a human, directly using the device.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G and 3G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by the 3rd Generation Partnership Project (3GPP), that extends and improves the performance of existing 3rd generation mobile telecommunication networks utilizing the WCDMA. Such networks may be named WCDMA/HSPA.

In 3GPP Long Term Evolution (LTE), which may be referred to as 4th generation or 4G, base stations, which may be referred to as eNodeBs or eNBs, may be directly connected to other base stations and may be directly connected to one or more core networks.

The 3GPP has undertaken to evolve further the UTRAN and GSM based radio access network technologies, for example into Evolved UTRAN (E-UTRAN) used in LTE.

The expression downlink, which may be abbreviated DL, is used for the transmission path from the base station to the wireless device. The expression uplink, which may be abbreviated UL, is used for the transmission path in the opposite direction i.e. from the wireless device to the base station.

Machine Type of Communication (MTC) has in recent years, especially in the context of the Internet of Things (IoT), shown to be a growing market segment for cellular technologies, especially for GSM/EDGE with its more or less global coverage, ubiquitous connectivity and price competitive devices. Realization of IoT benefits from utilizing cellular technologies, and GSM technology is of great, perhaps of greatest, interest to utilize, at least initially. In general it is desirable to be able to (re)use existing wireless communication systems and cellular technologies for new type of devices such as MTC devices. An MTC device is typically a wireless device that is a self and/or automatically controlled unattended machine and that is typically not associated with an active human user in order to generate data traffic. A MTC device is typically much more simple, and associated with a more specific application or purpose, than, and in contrast to, a conventional mobile phone or smart phone. MTC involve communication to and/or from MTC devices, which communication typically is of quite different nature and with other requirements than communication associated with e.g. conventional mobile phones and smart phones. In the context of and growth of the IoT, it is evidently so that MTC traffic will be increasing and thus needs to be increasingly supported in and by wireless communication systems.

A problem related to (re)using existing technologies and systems is e.g. that the requirements for the new type of devices typically is different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic typically needs to continue to be supported by and in the system, preferably without any substantial disturbance and/or deterioration of already supported services and performance.

Any modification need of existing systems and technology should of course be cost efficient, such as enabled by low complexity modifications, and preferably allowing legacy devices already being employed to continue to be used and co-exist with the new type of devices in one and the same wireless communication network.

EC-GSM is e.g. discussed in GP-151039, "New Work Item on Extended Coverage GSM (EC-GSM) for support of Cellular Internet of Things (CIoT_EC_GSM)", Ericsson LM, Intel, Gemalto N.V., MediaTek Inc., TeliaSonera AB, Sierra Wireless, S.A., Telit Communications S.p.A., ORANGE, Nokia Networks, Alcatel Lucent.

Cellular Internet of Things (IoT), is e.g. discussed in 3GPP TR 45.820 V13.0.0, "Cellular System Support for Ultra Low Complexity and Low Throughput Internet of Things".

The extended coverage, i.e. a coverage range beyond that of legacy GPRS/EGPRS operation, is in EC-GSM based on blind physical layer repetitions, of e.g. bursts and/or radio blocks, in both uplink and downlink where the number of repetitions is associated to a given Coverage Class (CC). Each CC is approximated with a level of extended coverage range compared to legacy, i.e. conventional, GPRS/EGPRS operation. That is, each CC represents a certain amount of degradation compared to legacy GPRS/EGPRS operation (e.g. 3 dB) such that the number of blind physical layer repetitions associated with each CC is proportional to its corresponding degradation compared to legacy GPRS/EGPRS operation. CC1 typically corresponds to the coverage range of legacy GPRS/EGPRS operation, i.e. extended coverage not used.

The retransmission procedure for the legacy Random Access CHAnnel (RACH) is specified in 3GPP TS 44.018, see e.g. version 12.6.0. In particular the number of slots between two successive RACH messages, excluding the slots containing the messages themselves, is a random value drawn randomly for each new transmission with uniform probability distribution in a set {S, S+1, . . . , S+T 1}, where T is a parameter Tx broadcasted on the Broadcast Control CHannel (BCCH) and the parameter S depends on the Common Control Channel (CCCH) configuration and on the value of Tx-integer as defined in Table 1 below.

TABLE 1

| | Values of parameter S | |
|---|---|---|
| TX-integer | S non combined CCCH | S combined CCH/SDCCH |
| 3, 8, 14, 50 | 55 | 41 |
| 4, 9, 16 | 76 | 52 |
| 5, 10, 20 | 109 | 58 |
| 6, 11, 25 | 163 | 86 |
| 7, 12, 32 | 217 | 115 |

The CCCH configuration combined Common Control CHannel—(CCCH) and/or Standalone Dedicated Control CHannel (SDCCH) is used for Circuit Switched (CS) services and can thus be disregarded in the analysis. FIG. 1 illustrates the retransmission windows, as dotted rectangles, when the initial RACH request is made on slot 0 in multi frame N. It can be seen that generally the parameters Tx and S controls the size of the window and in which multi frame the re-transmission attempt will occur, respectively. Generally speaking, the parameter S can be used to control if the retransmissions occur in multi frame N+1, N+2, N+3 and N+4, when assuming initial RACH in the first slot in multi frame N.

Generally, the recommendations for the parameter settings are as follows:
  If the Access Grant CHannel (AGCH) is not overloaded, the parameter S should be as low as possible in order to shorten access time.
  If AGCH is overloaded, the parameter S should be large, e.g. to allow the MS receive an Immediate Assignment.
  If RACH collisions are low, then parameter Tx should be low in order to shorten access time)
  If RACH collisions are high, the parameter Tx should be large in order to decrease probability for collision at subsequent retransmission attempts.

To sum it up, the parameters S and T can be tuned to cater for various degrees of RACH and AGCH load. However, whenever the RACH loading increases, then the AGCH loading can be expected to increase in direct proportion. In addition, it should be noted that since the value for the Tx-integer is sent as part of the BCCH, it is not expected to be dynamically adjusted to reflect real time variations in RACH loading. This suggests that operators in practice will simply select a value for the Tx-integer that reflects the spacing of RACH message retransmissions appropriate for the anticipated busy hour loading of any given CCCH, i.e. the greater the busy hour loading anticipated, the greater the value for S that is to be used and the value of the Tx-integer is selected accordingly.

Since RACH transmissions and retransmissions are vital, it is desirable and important that RACH transmissions and retransmission procedures work and are efficient also in the case of EC-GSM.

SUMMARY

It is an object to alleviate or at least reduce one or more problems indicated herein. Hence, the object may be to provide one or more improvements with regard to RACH transmissions and that are suitable for a wireless communication network supporting EC-GSM.

According to a first aspect of embodiments herein, the object is achieved by a first method, performed by a device, for managing a retransmission on a Random Access CHAnnel (RACH) in a wireless communication network. The device performs the retransmission on the RACH, wherein the retransmission is based on a coverage class associated with the device.

According to a second aspect of embodiments herein, the object is achieved by a computer program comprising instructions that when executed by a device causes the device to perform the first method according to the first aspect.

According to a third aspect of embodiments herein, the object is achieved by a computer readable medium comprising the computer program according to the second aspect.

According to a fourth aspect of embodiments herein, the object is achieved by a second method, performed by a network node, for managing a retransmission made by a device on a RACH in a wireless communication network comprising the network node. The device being configured to perform a retransmission on the RACH based on a first time duration during which retransmission on the RACH is allowed and/or on a second time duration that is a time duration between successive occasions, separated in time, when retransmission on the RACH is allowed. The first time duration being based on a first parameter and a coverage class associated with the device, the second time duration being based on a second parameter and the coverage class. The network node obtains the first parameter and/or the second parameter. The network node then sends the obtained first parameter and/or the obtained second parameter to the device.

According to a fifth aspect of embodiments herein, the object is achieved by a computer program comprising instructions that when executed by a network node causes the network node to perform the second method according to the fourth aspect.

According to a sixth aspect of embodiments herein, the object is achieved by a computer readable medium comprising the computer program according to the fifth aspect.

According to a seventh aspect of embodiments herein, the object is achieved by a device for managing a retransmission on a RACH in a wireless communication network. The device is configured to perform the retransmission on the RACH, wherein the retransmission is based on a coverage class associated with the device.

According to an eighth aspect of embodiments herein, the object is achieved by a network node for managing a retransmission made by a device on a RACH in a wireless communication network comprising the network node. The device being configured to perform a retransmission on the RACH based on a first time duration during which retransmission on the RACH is allowed and/or on a second time duration that is a time duration between successive occasions, separated in time, when retransmission on the RACH is allowed. The first time duration being based on a first parameter and a coverage class associated with the device and the second time duration being based on a second parameter and the coverage class. The network node is configured to obtain the first parameter and/or the second parameter. The network node is further configured to send the obtained first parameter and/or the obtained second parameter to the device.

Basing the retransmission on the coverage class e.g. enables reduction of retransmission collisions when the wireless communication network operates as in EC-GSM, compared to if retransmissions instead would be as conventionally in GSM, i.e. according to a legacy RACH retransmission procedure, where retransmissions do not take any coverage class into account and thus are not based on coverage classes. The wireless communication network can, via the network node, in turn manage said retransmission based on coverage class by means of the first and/or second parameters that affect said first and/or second time durations.

BRIEF DESCRIPTION OF THE DRAWINGS

The various aspects of embodiments disclosed herein, including particular features and advantages thereof, will be readily understood from the following detailed description and the accompanying schematic drawings, in which FIGS. 1-9 are shown.

FIG. 1 illustrates an example of prior art GSM retransmission windows when an initial RACH request is made on slot 0 in multi frame N.

FIG. 2 illustrates an example of EC-RACH transmissions and how these may depend on coverage class.

FIG. 3 is a block diagram schematically depicting an example of a wireless communication network in which embodiments herein may be implemented.

FIG. 4 is a combined signaling diagram and flowchart for describing some embodiments herein.

FIG. 5 is a flowchart schematically illustrating embodiments of a first method according to embodiments herein.

FIG. 6 is a functional block diagram for illustrating embodiments of a device according to embodiments herein and how it can be configured to carry out the first method.

FIG. 7 is a flowchart schematically illustrating embodiments of a second method according to embodiments herein.

FIG. 8 is a functional block diagram for illustrating embodiments of a network node according to embodiments herein and how it can be configured to carry out the second method.

DETAILED DESCRIPTION

Figure 1:
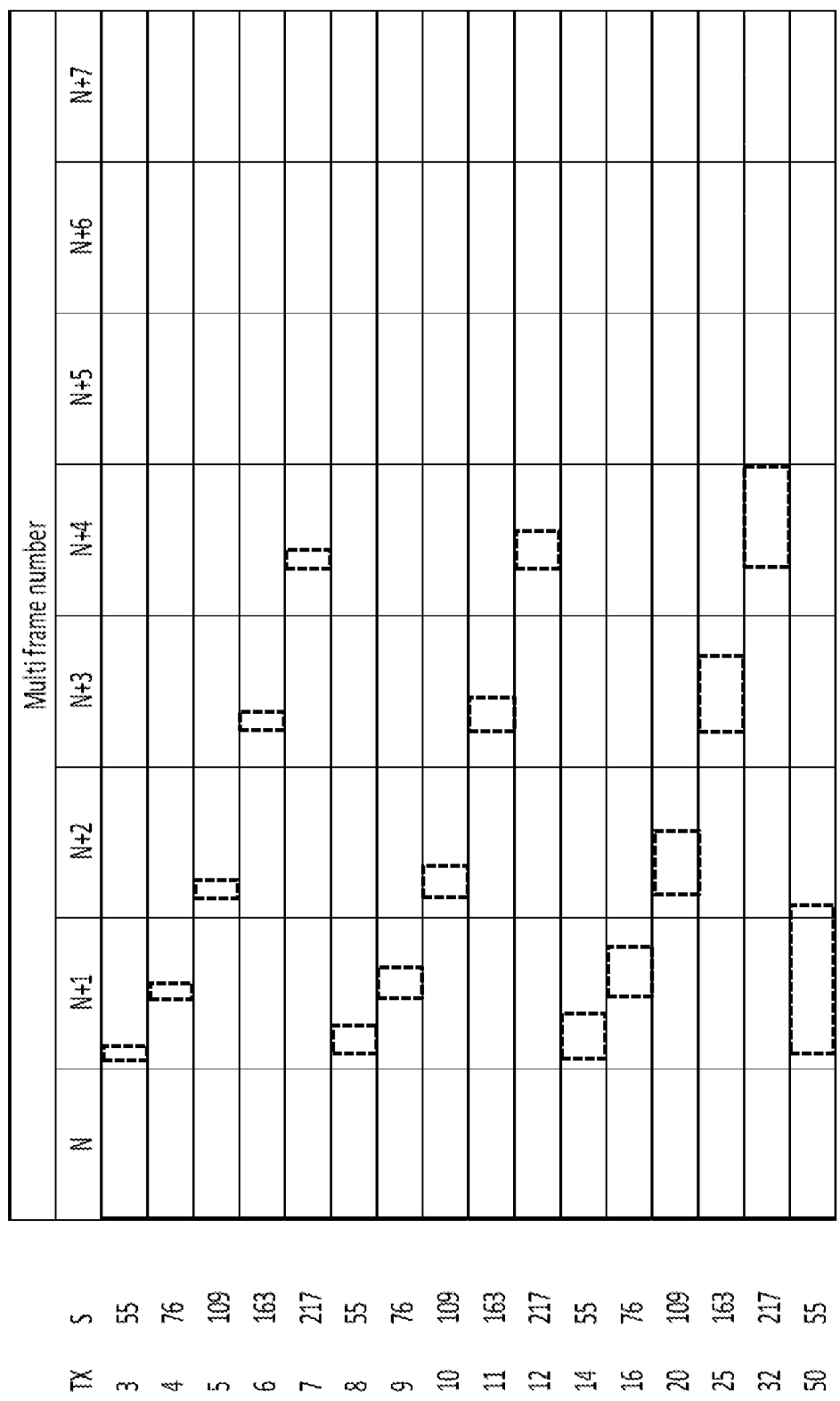

Throughout the following description similar reference numerals have been used to denote similar elements, units, modules, circuits, nodes, parts, items or features, when applicable. In the Figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As a development towards embodiments herein, problems generally indicated in the Background will first be further elaborated upon, in particular in the context of EC-GSM.

Figures 2A, 2B:
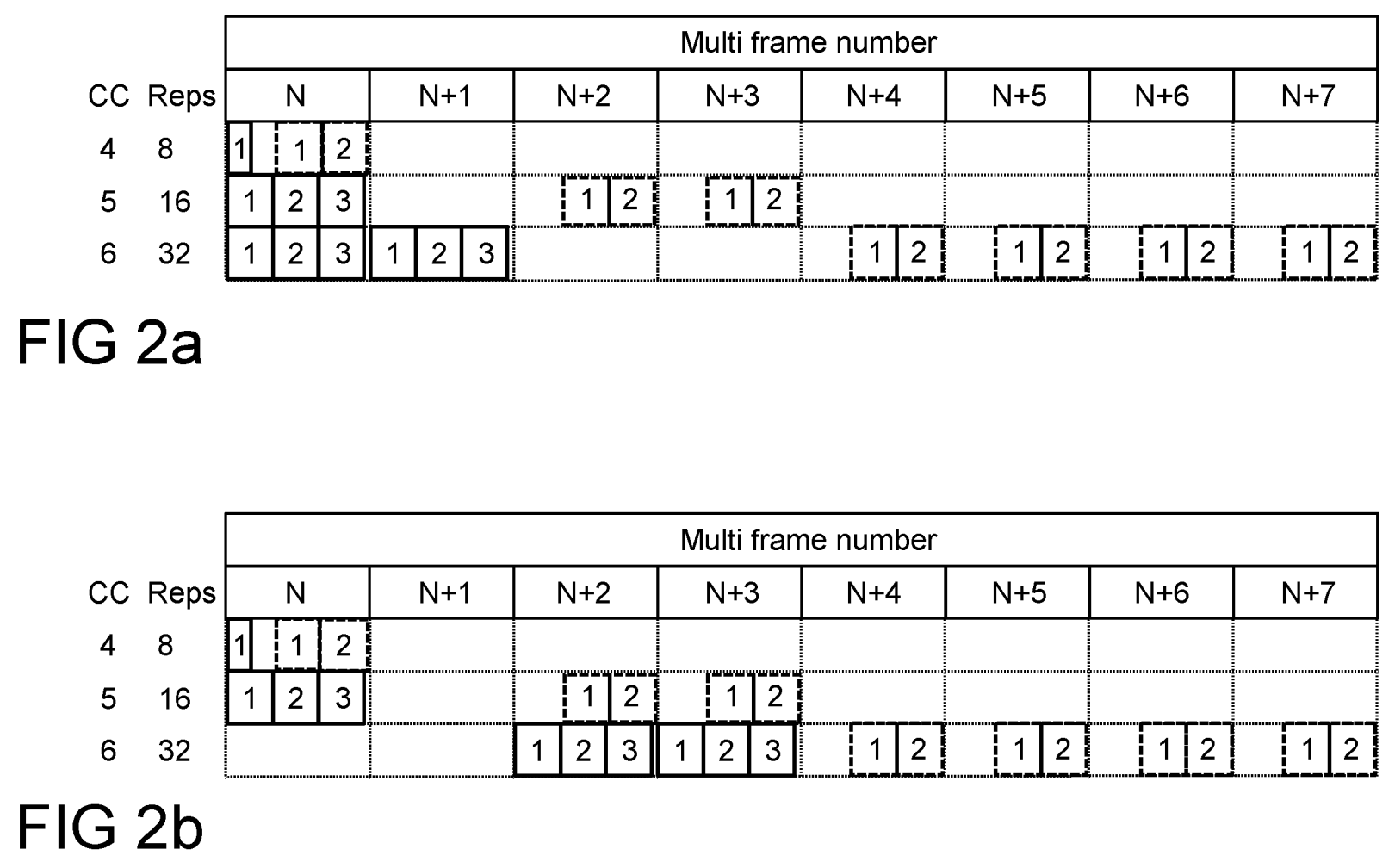

FIG. 2 illustrates an example of EC-RACH transmissions in thick solid lines, and example of Extended Coverage-AGCH (EC-AGCH) reception opportunities in thick dotted lines, as a function of CC. Repetitions (reps) associated with each CC are also shown in the figure. In other words, FIG. 2 illustrates the RACH transmission and first possible AGCH reception opportunities as a function of CC assuming that the first RACH transmission attempt is made in multi frame N or N and N+1, see FIG. 2a, or in multi frame N+2 and N+3 for CC6, see FIG. 2b. The thick solid and dotted lines are used to illustrate different transmission and reception opportunities, respectively. Opportunities within each multi-frame have been consecutively numbered, e.g. the first opportunity has been numbered 1, the second 2, etc. Note that due to limitations in how small details are suitable in the drawings, no EC-RACH transmission opportunities and no EC-AGCH reception opportunities are shown for CC 1-3, and for CC4 only the first RACH transmission opportunity has been illustrated.

For CC 1-4, although not shown for CC 1-3, there are both RACH transmission and AGCH reception opportunities in multi frame N. This implies that, if there has been a collision and the AGCH load is low, it would be possible for the device, e.g. a wireless device, to send a RACH retransmission in multi frame N+1 similar to the legacy case as shown in FIG. 1. However, for a CC5 and CC6 device the situation would typically be very different. For a CC5 device that makes a first RACH transmission attempt in multi frame N, then, if allowing for at least two possible instances of receiving a response on the AGCH, in multi frames N+2 and N+3, before considering a retransmission, the first possible RACH retransmission opportunity is in multi frame N+4. Correspondingly, for a CC6 device that makes a first RACH transmission attempt in multi frames N and N+1, as in FIG. 2a, or N+2 and N+3, as in FIG. 2b, and it is allowed for two possible instances of receiving a response on the AGCH, in multi frames N+4 through N+7, before considering the possibility of a retransmission, the first retransmission opportunity is in multi frame N+8, irrespective if the first access transmission attempt started in multi frame N or N+2.

Moreover, the fact that repetitions in EC-GSM are used to extend coverage has some interesting implications on the probability of yet another collision at the retransmission. More specifically, if it is assumed that the retransmission opportunity is drawn randomly such that, after first allowing for two possible instances of receiving a response on the AGCH, the first possible multi frame thereafter happens to be selected for making a retransmission, then the following observations can be made.

- If two CC1 devices collide in multi frame N and make a retransmission attempt anywhere in multi frame N+1 the collision probability is 1/51.
- Similarly if two CC2, CC3 and CC4 devices collide in multi frame N then the probability of collision is 2/50, 4/48 and 8/48, respectively.
- If two CC5 devices collide in multi frame N and a retransmission attempt is made in multi frame N+4 the probability of collision is 1/3.
- If two CC6 devices collide in multi frame N and a retransmission attempt is made in multi frame N+8 the probability of collision is 1/3.

Based on the above observations it can be seen that the legacy RACH retransmission procedure cannot be completely reused for EC-GSM since it does not take into account (a) the amount of time needed for a coverage class specific EC-RACH retransmission attempt or (b) the amount of time needed for a coverage class specific EC-AGCH reception to take place after making an EC-RACH transmission or re-transmission. In other words, a new EC-RACH retransmission procedure for EC-GSM devices should be needed to take both these aspects into account. To make sure the collision probability for an EC-RACH retransmission attempt is kept at a reasonable level, the set of coverage class specific multi-frames, from which a retransmission opportunity is randomly selected, should be large enough to keep the probability of 2 devices selecting the same retransmission opportunity about 10% or less.

Figure 3:
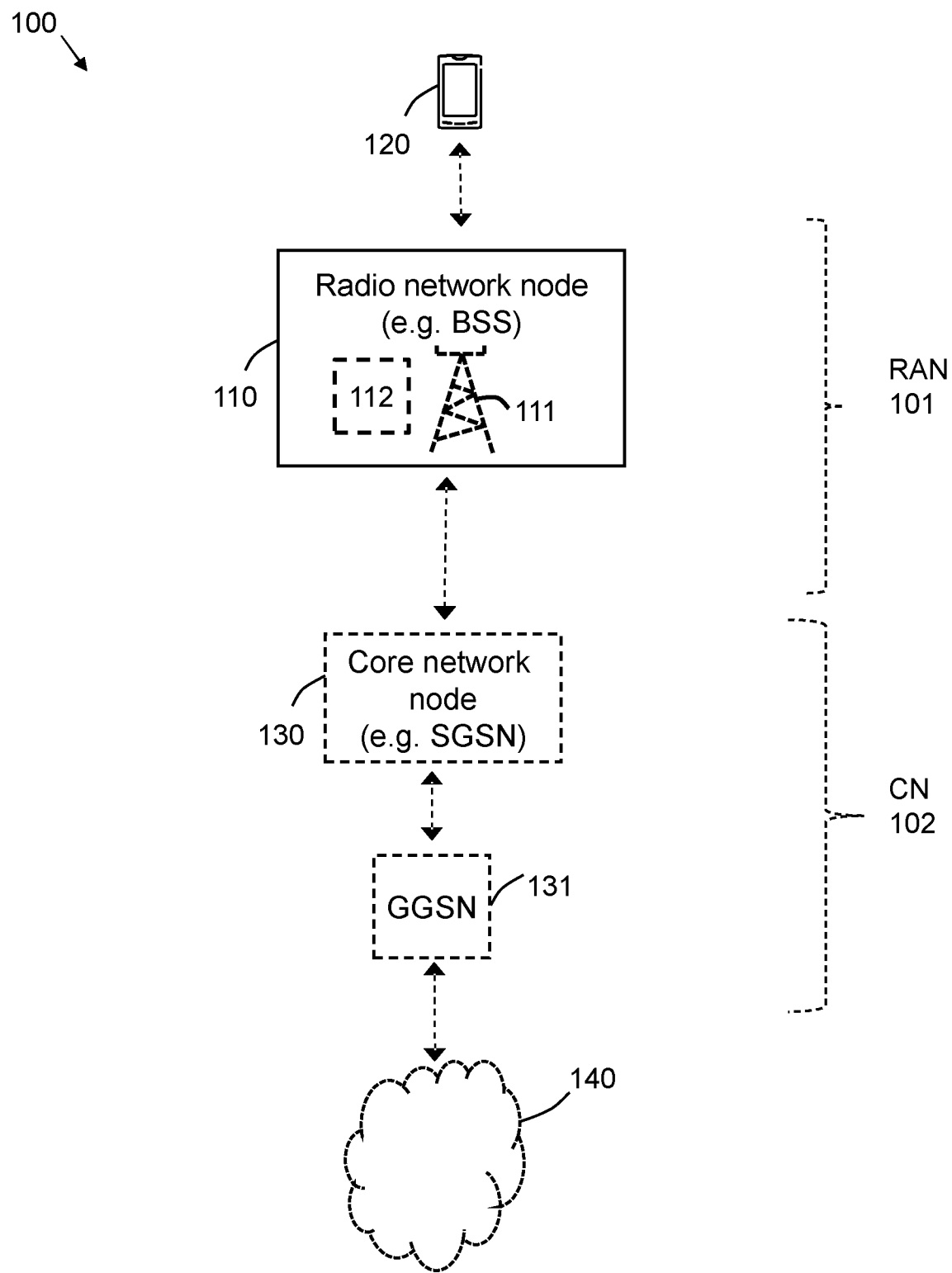

FIG. 3 is a schematic block diagram schematically depicting an example of a wireless communication network 100 in which embodiments herein may be implemented. The wireless communication network 100 is typically a telecommunication network or system, such as a cellular communication network that may be a GSM network or a GSM based communication network. It may comprise a RAN 101 part and a core network (CN) 102 part. The wireless communication network 100 typically supports EC-GSM. The wireless communication network may support coverage classes that may be CCs, i.e. coverage classes, defined for EC-GSM. The coverage classes are associated with different coverage, respectively.

As used herein, "coverage class" may refer to an ability of a wireless device to communicate with the wireless communication network from a certain location and/or under certain conditions. E.g. a first wireless device supporting a first coverage class may not be able to communicate with the wireless communication network operating according to the first coverage class from a certain location under certain conditions, while another, second wireless device supporting another, second coverage class may be able to communicate with the wireless communication network operating according to the second coverage class, although the second wireless device is located at the same location and under the same conditions as the first wireless device.

A radio network node 110 is shown comprised in the wireless communication network 100 and in the RAN 101. The network node 110 may be a radio network node as illustrated in the figure and may be or be comprised in a Base Station Subsystem (BSS), e.g. such supporting GSM/EDGE, for example when the when the wireless communication network 100 is a GSM network or a GSM based communication network. The radio network node 110 may be or comprise a base station 111, e.g. a Base Transceiver Station (BTS) of said BSS. The radio network node 110 may further comprise a controlling node 112 of a base station, which may control one or more base stations, including e.g. the base station 111, and may be a Base Station Controller (BSC) of said BSS.

The network node 110, or another network node, may serve and/or control and/or manage one or more wireless devices, e.g. MSs, such as a wireless device 120 shown in the figure, which are supported by and/or operative in the wireless communication network 100. The wireless device 120 may be of any type discussed herein, but is typically a MTC device and/or support EC-GSM and/or operate according to EC-GSM. The wireless device 120 may be associated with, e.g. support or operate according to, one or more, typically one, at least at a time, of said coverage classes that the wireless communication network supports.

Further, a core network node 130 may be comprised in the wireless communication network 100 and in the CN 102. The core network node 130 may be a SGSN when the wireless communication network 100 is a GSM network or a GSM based communication network.

The wireless device 120 may communicate with and/or via the core network node over a radio network node, e.g. the network node 110. The CN 102 may provide access for the wireless device to an external network 140, e.g. the Internet. The wireless device 120 may thus communicate via the RAN 101 and the CN 102 with the external network 140. When the wireless communication network 100 is a GSM network or a GSM based communication network, such as one supporting EC-GSM, the access to the external network is typically via a Gateway GPRS Support Node (GGSN), such as the GGSN 131 illustrated in the figure.

Attention is drawn to that FIG. 3 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

Given that EC-GSM devices in general are delay tolerant, the parameter T for EC-GSM devices may be redefined or be replaced to e.g. specify over how many units of multi frames shall be used to define the EC-RACH Tx time window, i.e. the set of coverage class specific EC-RACH retransmission opportunities, from which one specific opportunity shall be randomly drawn and used for a new EC-RACH retransmission attempt. This new parameter may be denoted $T_m$. Similarly it is furthermore proposed to, for EC-GSM devices, redefine or replace the parameter S to specify how many multi frames away from an original EC-RACH transmission attempt, excluding the multi frame used to complete transmission of the original EC-RACH transmission attempt, that a new EC-RACH Tx time window starts. This new parameter may be denoted Sm. As indicated above, the size of the EC-RACH Tx time window, thus determined by Tm, may need to take coverage class into account in order for the retransmission attempt to occur in the correct multi frame and to make sure the collision probability at EC-RACH retransmission is kept at a reasonable level. Similarly, the amount of time a device waits before the new EC-RACH Tx time window starts, thus determined by Sm, may need to take into account the coverage class since the higher the coverage class the fewer the number of EC-AGCH opportunities for receiving a response, to the EC-RACH transmission/retransmission, during the waiting period.

Note that when an initial, i.e. first, EC-RACH transmission attempt is made to send a page response, a device can also use Tm to determine the set of coverage class specific EC-RACH retransmission opportunities from which it shall randomly select one specific opportunity for sending the page response. In this case the set of multi frames comprising the EC-RACH Tx window, i.e. determined by Tm, typically starts with the multi frame immediately following the last multi frame used for receiving the corresponding paging request.

When an initial, i.e. first, EC-RACH transmission attempt is made, other than for sending a page response, a device can use the first available EC-RACH transmission opportunity corresponding to its coverage class.

Based on the discussion above, the following is proposed merely as an example for managing the size of the EC-RACH retransmission window and length of the waiting period between two successive EC-RACH transmission attempts:

A number of multi frames between two successive EC-RACH transmission attempts, excluding the multi frames containing the EC-RACH transmission attempts themselves, is determined by Scc, e.g. as shown in Table 2a or 2b below. The set of retransmission opportunities in an EC-RACH Tx window is determined by coverage class and the size of EC-RACH Tx window, e.g. determined by Tcc as shown in Table 2a or 2b below. Each EC-RACH retransmission attempt should be made using a coverage class specific transmission opportunity drawn randomly, e.g. with uniform probability distribution, from a set of transmission opportunities within each EC-RACH Tx time window. The parameters Tm and Sm, which each may be 2 bits long, may be broadcast on the EC-BCCH. The parameter Sm indicates a range of 0 to 3 multi frames while the parameter Tm indicates a range of 1 to 4 multi frames.

TABLE 2a

A first example with values of parameters Scc and Tcc

| Coverage class | Scc | Tcc |
| --- | --- | --- |
| CC1 | Sm | Tm |
| CC2 | Sm | Tm |
| CC3 | Sm + 1 | Tm + 1 |
| CC4 | Sm + 2 | Tm + 1 |
| CC5a (51-MF mod 2 = 0 for EC-RACH transmission attempt) | 1 + 2*(Sm + 2) | Tm + 2 |
| CC5b (51-MF mod 2 = 1 for EC-RACH transmission attempt) | 2*(Sm + 2) | Tm + 2 |
| CC6a (51-MF mod 4 = 0 and 1 for EC-RACH transmission attempt) | 2 + 4*(Sm + 2) | 2*(Tm + 2) |
| CC6b (51-MF mod 4 = 2 and 3 for EC-RACH transmission attempt) | 4*(Sm + 2) | 2*(Tm + 2) |

TABLE 2b

A second example with values of parameters Scc and Tcc

| Coverage class | Scc | Tcc |
| --- | --- | --- |
| CC1 | Sm | Tm |
| CC2 | Sm | Tm |
| CC3 | Sm + 1 | Tm + 1 |
| CC4 | Sm + 2 | Tm + 1 |
| CC5a (51-MF mod 2 = 0 for EC-RACH transmission attempt) | 1 + 1*(Sm + 2) | Tm + 2 |
| CC5b (51-MF mod 2 = 1 for EC-RACH transmission attempt) | 1*(Sm + 2) | Tm + 2 |
| CC6a (51-MF mod 4 = 0 and 1 for EC-RACH transmission attempt) | 2 + 2*(Sm + 2) | 2*(Tm + 2) |
| CC6b (51-MF mod 4 = 2 and 3 for EC-RACH transmission attempt) | 2*(Sm + 2) | 2*(Tm + 2) |

As an example Sm=1 and Tm=1 are assumed which, in case of Table 2a, results in Scc and Tcc as per Table 3 below.

TABLE 3

Example values of parameter Scc and Tcc

| Coverage class | Scc | Tcc |
| --- | --- | --- |
| CC1 | 1 | 1 |
| CC2 | 1 | 1 |
| CC3 | 2 | 2 |
| CC4 | 3 | 2 |
| CC5a | 7 | 3 |
| CC5b | 6 | 3 |
| CC6a | 14 | 6 |
| CC6b | 12 | 6 |

Moreover, as a further example, and for the sake of simplicity with Sm and Tm as in the example above, the first EC-RACH transmission attempt may be considered to be made in multi frame N=0, or in multi frame N=1 for CC5b device, or in multi frames N=0 and 1 or N=2 and 3 for a CC6a and CC6b device, respectively. In such case the case coverage class specific spacing of EC-RACH transmissions and the number of EC-RACH transmission opportunities per EC-RACH Tx time window may become as follows:

CC1: 1st EC-RACH transmission attempt in multi frame N=0 and the second is made in multi frame N=2. There are 51 EC-RACH retransmission opportunities in multi frame 2 from which a CC1 device randomly selects a single opportunity. There are up to 20 EC-AGCH reception opportunities between 2 successive EC-RACH transmissions.

CC2: 1st EC-RACH transmission attempt in multi frame N=0 and the second is made in multi frame N=2. There are 25 EC-RACH transmission opportunities in multi frame 2 from which a CC2 device randomly selects a single opportunity. There are up to 10 EC-AGCH reception opportunities between 2 successive EC-RACH transmissions.

CC3: 1st EC-RACH transmission attempt in multi frame N=0 and the second is made in multi frame N=3 or N=4. There are 24 EC-RACH transmission opportunities in multi frames 3 and 4 from which a CC3 device randomly selects a single opportunity. There are up to 10 EC-AGCH reception opportunities between 2 successive EC-RACH transmissions.

CC4: 1st EC-RACH transmission attempt in multi frame 0 and the second is made in multi frame N=4 or N=5. There are 12 EC-RACH transmission opportunities in multi frames N=4 and N=5 from which a CC4 device randomly selects a single opportunity. There are 6 EC-AGCH reception opportunities between 2 successive EC-RACH transmissions.

CC5a and CC5b: 1st EC-RACH transmission attempt in multi frame N=0 (CC5a) or N=1 (CC5b) and the second is made in multi frames 8, 9 or 10. There are 9 EC-RACH transmission opportunities in multi frames 8, 9 and 10 from which a CC5 device randomly selects a single opportunity. There are 6 EC-AGCH reception opportunities between 2 successive EC-RACH transmissions.

CC6a and CC6b: 1st EC-RACH transmission attempt in multi frame N=0 and 1 (CC6a) or N=2 and 3 (CC6b), and the second is made in multi frames 16 and 17, or in multi frames 18 and 19, or in multi frames 20 and 21. There are 9 EC-RACH transmission opportunities in multi frames 16 through 21 from which a CC6 device randomly selects a single opportunity. There are 6 EC-AGCH reception opportunities between 2 successive EC-RACH transmissions.

In brief, based on the above: As described in the beginning of the Description, the legacy RACH retransmission procedure should need to change to better accommodate the different coverage classes associated with EC-GSM and operation according to EC-GSM. New parameters, that may be denoted Sm and Tm, as described above may be introduced and can be sent as new system information to (a) control the time between two successive EC-RACH retransmissions and (b) determine the set of transmission opportunities from which a single opportunity is randomly selected when an EC-RACH retransmission attempt is needed.

Figure 4:
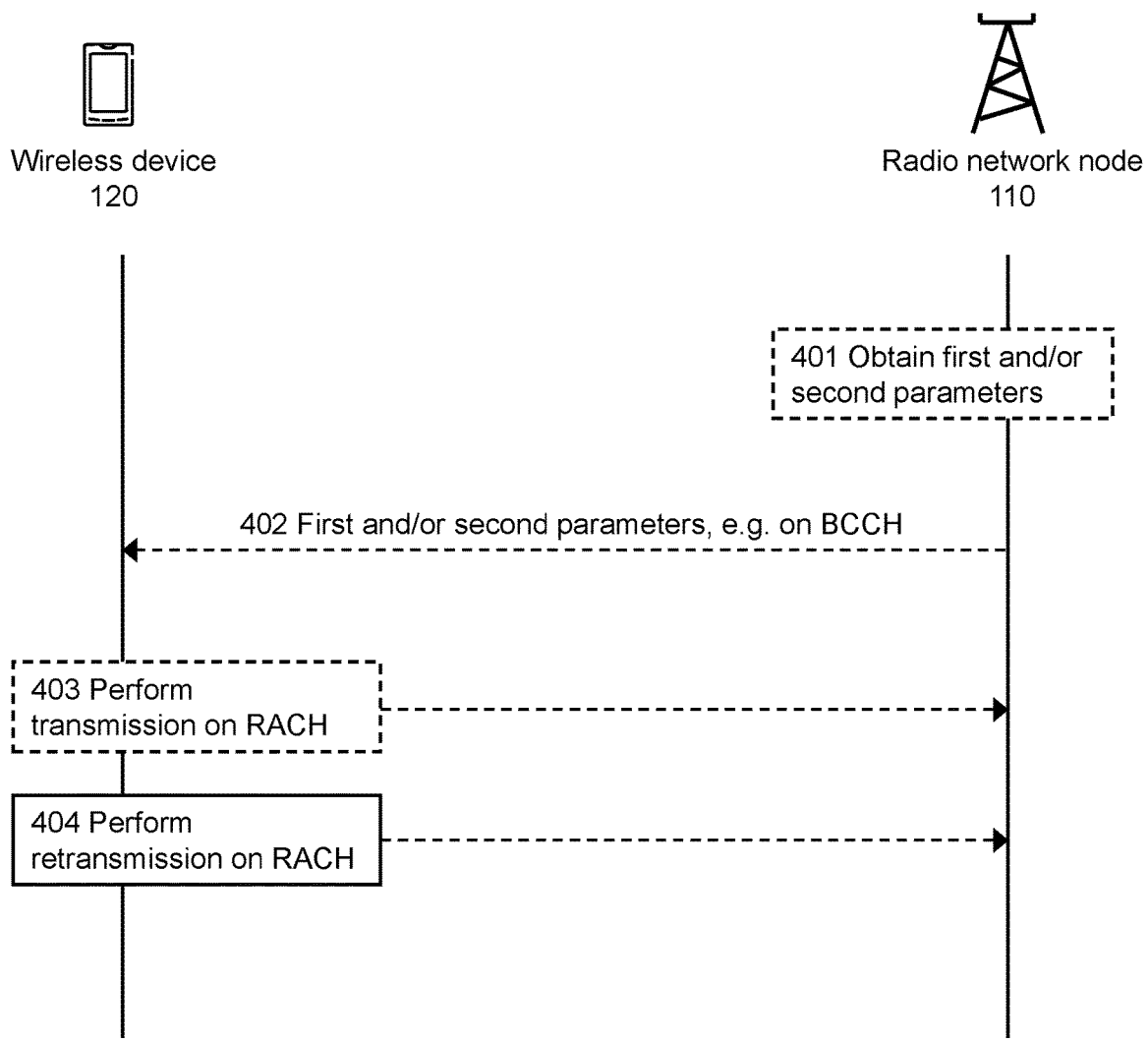

FIG. 4 depicts a combined signaling diagram and flowchart, which will be used to discuss embodiments herein. The involved nodes, as shown in the figure, is a device that may be the wireless device 120 and a network node that may be the radio network node 110.

The methods and actions discussed in the following are for managing a retransmission on a RACH in a wireless communication network, e.g. the wireless communication network 100.

As used herein, "retransmission on a RACH" may refer to retransmission in response to, or of, a previous transmission on the RACH that have failed, e.g. an initial, or first, transmission attempt that have failed. The retransmission may have the same purpose as the previous transmission but may be associated with some different characteristic, e.g. be associated with another time reference, such as another frame or multi frame and/or another coverage class, than the previous transmission.

The RACH may be a RACH of another type than a first type of RACH supported by the wireless communication network 100, or by a Radio Access Technology (RAT) thereof. For example, the RACH may be an EC-RACH, supported by the wireless communication network 100 when the wireless communication network 100 supports EC-GSM and that may be in addition to or instead a of another RACH, e.g. a RACH according to conventional GSM, i.e. not specifically EC-GSM. The EC-RACH is thus a RACH associated specifically with, such as for operation with, EC-GSM.

The actions below may be taken in any suitable order and/or be carried out fully or partly overlapping in time when this is possible and suitable.

Action 401

The radio network node 110 obtains a first parameter and/or a second parameter. The first parameter may correspond to the parameter Tm discussed above and the second parameter may correspond to the parameter Sm discussed above.

Action 402

The radio network node 110 sends and the wireless device 120 receives the first parameter and/or the second parameter. Said parameter(s) may be sent as part of system information and/or may be sent by being be broadcasted on a certain channel, e.g. a Broadcast Control Channel, BCCH, such as the EC-BCCH mentioned herein.

Action 403

The wireless device 120 performs a transmission on the RACH, i.e. a first, e.g. initial transmission, as described above. The transmission may fail for some reason and e.g. not validly reach an intended recipient, e.g. the radio network node 110.

Action 404

The wireless device 120 performs a retransmission on the RACH, wherein the retransmission is based on, e.g. determined by, a coverage class associated with the wireless device 120. The retransmission may be a retransmission of the transmission in action 403, i.e. of an initial or first transmission, e.g. in response to that the transmission failed for some reason and did not validly reach an intended recipient, e.g. the radio network node 110. As should be realized, the retransmission may be part of so called blind repetitions as mentioned above and that extended coverage in EC-GSM typically is based on. The retransmission may or may not succeed in reaching the intended recipient, e.g. the radio network node 110

As explained above, basing the retransmission on the coverage class enables reduction of retransmission collisions when the wireless communication network supports EC-GSM, compared to if retransmissions instead would be as conventionally in GSM, i.e. according to a legacy RACH retransmission procedure, where retransmissions do not take coverage classes into account and thus are not based on coverage classes.

The retransmission on the RACH may be further based on, e.g. determined by, a first time duration during which retransmission on the RACH is allowed. The first time duration may correspond to a size of a RACH transmission time window, such as the EC-RACH Tx window mentioned above. The first time duration may be specified in terms of a number of predefined or predetermined time frames or multi-frames where each multi-frame corresponds to a predefined or predetermined number of time frames. Hence, said number of predefined or predetermined multi-frames simply corresponds to a higher number of predefined or predetermined time frames, for example a 51-multiframe corresponds to 51 time frames.

The first time duration, e.g. a number of multi-frames that determines the size of the RACH transmission time window, may in turn be based on, e.g. determined by, a first parameter, such as the Tm parameter mentioned herein, and/or coverage class.

Moreover, the retransmission on the RACH may be further based on, e.g. determined by, a second time duration that is a time duration between successive occasions, separated in time, when retransmission on the RACH is allowed. EC-RACH transmission attempts mentioned herein are examples of said occasions. The second time duration may be specified in terms of a another number of predefined or predetermined time frames or multi-frames where each multi-frame corresponds to a predefined or predetermined number of time frames. The second time duration may include but in some embodiments excludes such time frames or multi-frames that comprises occasions when retransmission on the RACH is allowed, e.g. that comprise EC-RACH transmission attempts. The second time duration, e.g. a number of multi-frames between two successive EC-RACH attempts, may in turn be based on, e.g. determined by, a second parameter, such as the Sm parameter mentioned herein, and/or coverage class.

Figure 5:
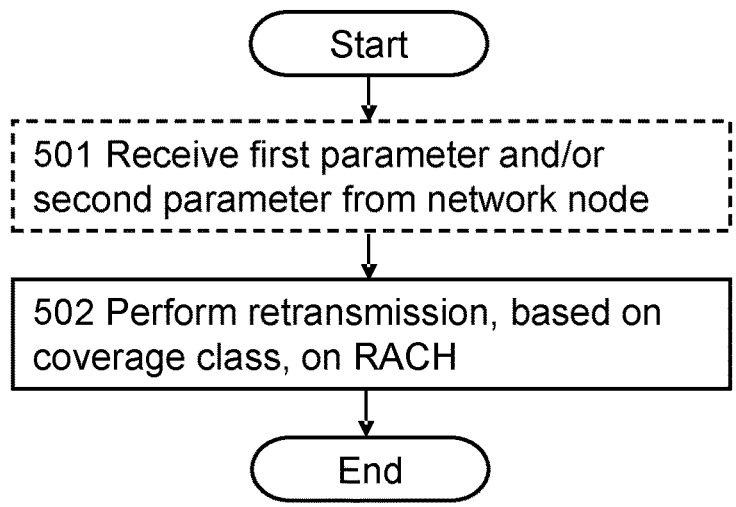

FIG. 5 is a flow chart schematically illustrating embodiments of a first method, performed by a device, e.g. the wireless device 120, for managing a retransmission on a RACH in a wireless communication network, e.g. the wireless communication network 100.

The first method comprises the following actions, which actions may be taken in any suitable order and/or be carried out fully or partly overlapping in time when this is possible and suitable.

Action 501

The wireless device 120 may receive, from a network node, e.g. the radio network node 110, of the wireless communication network 100, a first parameter and/or a said second parameter. Said parameter(s) are further discussed below and may be as discussed above.

This action may fully or partly correspond to action 402 as described above.

Action 502

The wireless device 120 performs a retransmission on the RACH, which retransmission is based on a coverage class associated with the wireless device 120. The retransmission on the RACH may further be based on a first time duration during which retransmission on the RACH is allowed. The first time duration may be specified in terms of a first number of predefined time-frames. The first time duration may be based on a first parameter, such as the first parameter received in Action 501, and the coverage class.

The retransmission on the RACH may further be based on a second time duration that is a time duration between successive occasions, separated in time, when retransmission on the RACH is allowed. The second time duration may be specified in terms of a second number of predefined time-frames. The second time duration may be based on a second parameter, such as the second parameter received in Action 501, and the coverage class.

This action may fully or partly correspond to action 404 as described above.

Figure 6:
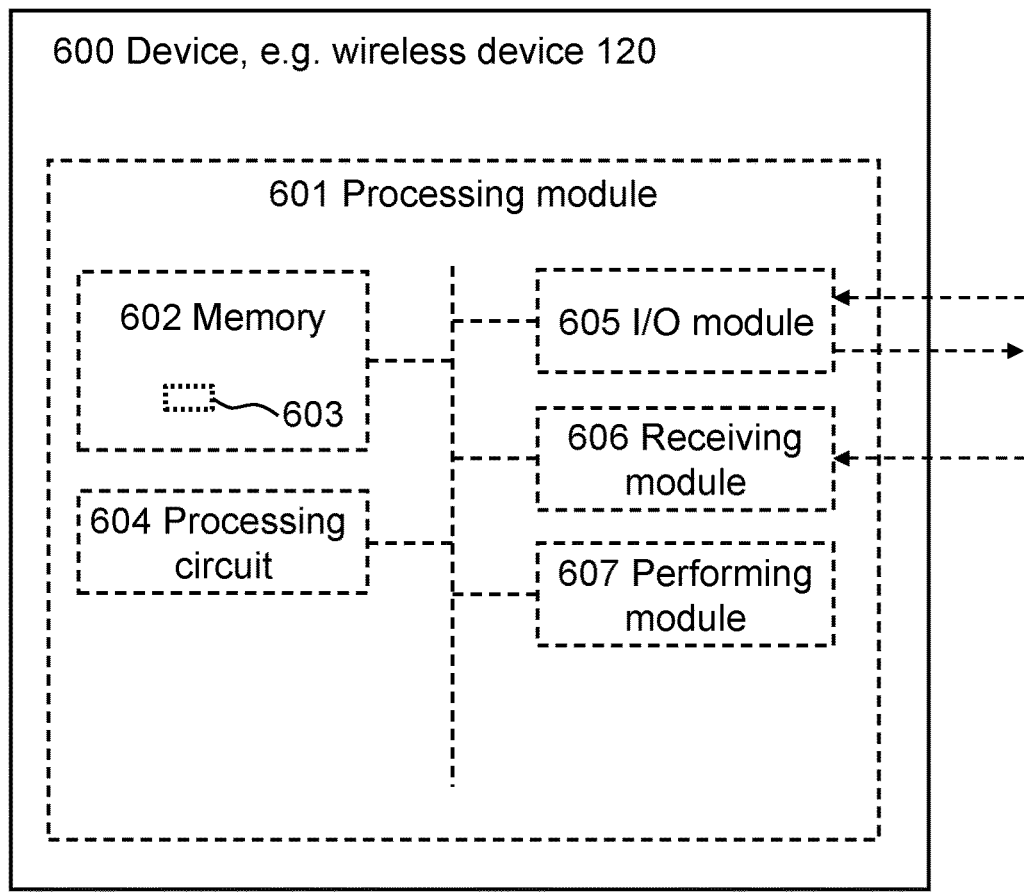

FIG. 6 is a schematic block diagram for illustrating embodiments of how a device 600, e.g. the wireless device 120, may be configured to perform the first method and actions discussed above in connection with FIGS. 4 and 5, and/or one or more other actions described herein.

The device 600 may comprise one or more of the following:

A processing module 601, such as a means, one or more hardware modules, including e.g. one or more processors, and/or one or more software modules for performing said methods and/or actions.

A memory 602, which may comprise, such as contain or store, a computer program 603. The computer program comprises 'instructions' or 'code' directly or indirectly executable by the device 600 so that it performs said method and/or actions. The memory 602 may comprise one or more memory units and may be further be arranged to store data, such as configurations and/or applications involved in or for performing functions and actions of embodiments herein.

A processing circuit 604 as an exemplifying hardware module and may comprise or correspond to one or more processors. In some embodiments, the processing module 601 may comprise, e.g. 'is embodied in the form of' or 'realized by' the processing circuit 604. In these embodiments, the memory 602 may comprise the computer program 603 executable by the processing circuit 604, whereby the device 600 comprising it is operative, or configured, to perform said method and/or actions.

An Input/Output (I/O) module 605, configured to be involved in, e.g. by performing, any communication to and/or from other units and/or nodes, such as sending and/or receiving information to and/or from other external nodes or devices. The I/O module 605 may be exemplified by an obtaining, e.g. receiving, module and/or a sending module, when applicable.

The device 600 may also comprise other exemplifying hardware and/or software module(s), which module(s) may be fully or partly implemented by the respective processing circuit. For example, the device 600 may further comprise one or more of a receiving module 606 and a performing module 607.

The device 600 and/or the processing module 601 and/or the processing circuit 604 and/or the performing module 607 are operative, or configured, to perform said retransmission on the RACH, which retransmission is based on a coverage class associated with the device 600.

In some embodiments, the device 600 and/or the processing module 601 and/or the processing circuit 604 and/or the I/O module 605 and/or the receiving module 606 are operative, or configured, to receive, from said network node 110 of the wireless communication network 100, the first parameter and/or the second parameter.

Figure 7:
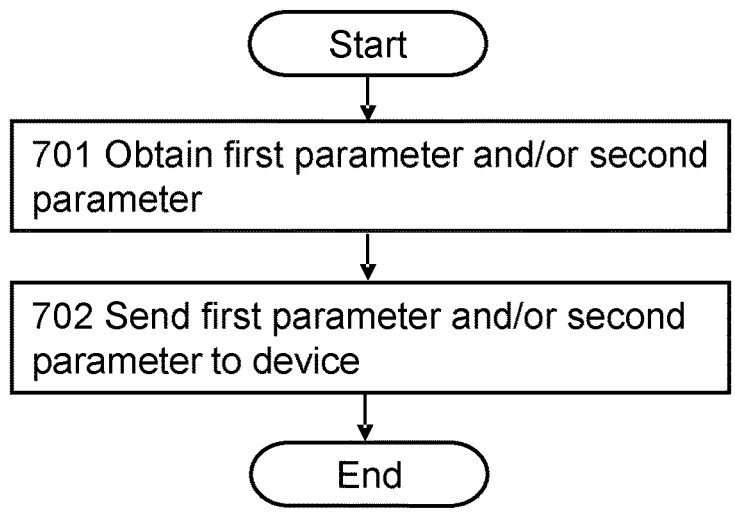

FIG. 7 is a flow chart schematically illustrating embodiments of a second method, performed by a network node, e.g. the radio network node 110, for managing a retransmission made by a device, e.g. the device 600 that may be the wireless device 120, on a RACH in a wireless communication network, e.g. the wireless communication network 100, comprising the radio network node 110. For the second method, the device 600 should be configured to perform a retransmission on the RACH based on a first time duration during which retransmission on the RACH is allowed and/or on a second time duration that is a time duration between successive occasions, separated in time, when retransmission on the RACH is allowed. The first time duration being based on a first parameter and a coverage class associated with the device 600. The second time duration being based on a second parameter and the coverage class.

The second method comprises the following actions, which actions may be taken in any suitable order and/or be carried out fully or partly overlapping in time when this is possible and suitable.

Action 701

The radio network node 110 obtains the first parameter and/or the second parameter.

This action may fully or partly correspond to action 401 as described above.

Action 702

The radio network node 110 sends the obtained first parameter and/or the obtained second parameter to the device 600.

This action may fully or partly correspond to action 402 as described above.

Figure 8:
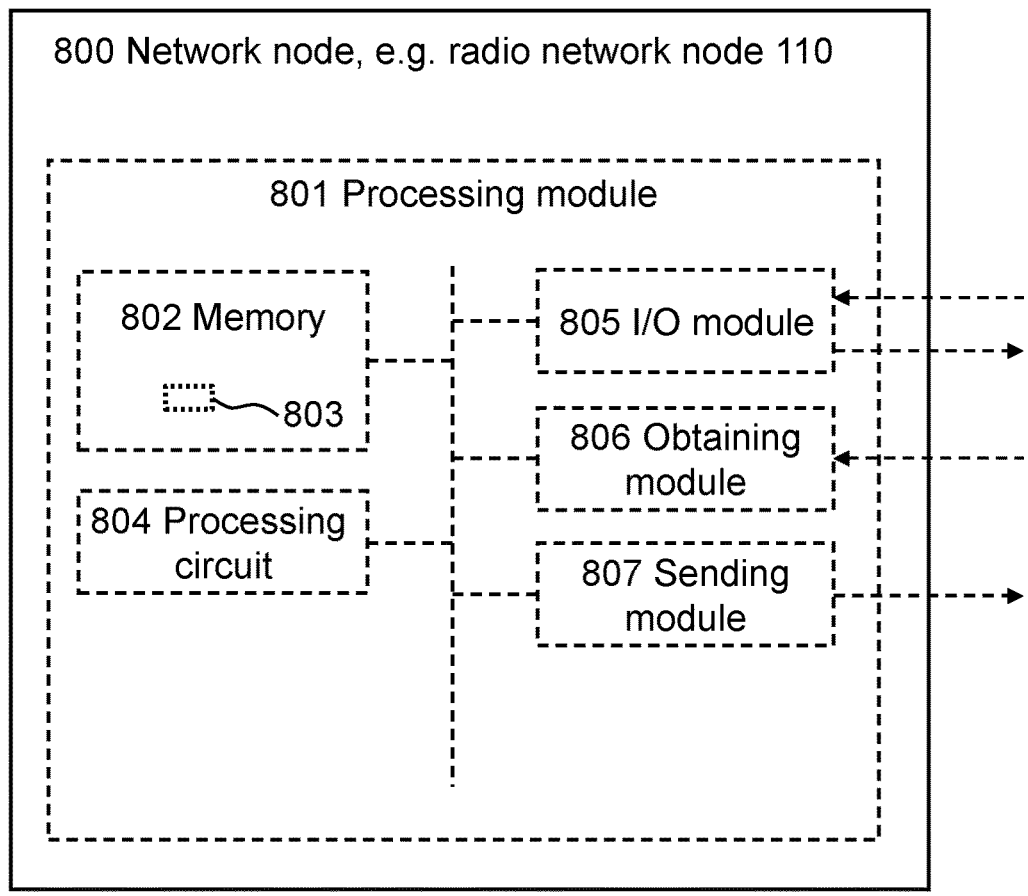

FIG. 8 is a schematic block diagram for illustrating embodiments of how a network node 800, e.g. the radio network node 110, may be configured to perform the second method and actions discussed above in connection with FIGS. 4 and 7, and/or one or more other actions described herein.

The network node 800 may comprise one or more of the following:

A processing module 801, such as a means, one or more hardware modules, including e.g. one or more processors, and/or one or more software modules for performing said methods and/or actions.

A memory 802, which may comprise, such as contain or store, a computer program 803. The computer program comprises 'instructions' or 'code' directly or indirectly executable by the network node 800 so that it performs said method and/or actions. The memory 802 may comprise one or more memory units and may be further be arranged to store data, such as configurations and/or applications involved in or for performing functions and actions of embodiments herein.

A processing circuit 804 as an exemplifying hardware module and may comprise or correspond to one or more processors. In some embodiments, the processing module 801 may comprise, e.g. 'is embodied in the form of' or 'realized by' the processing circuit 804. In these embodiments, the memory 802 may comprise the computer program 803 executable by the processing circuit 804, whereby the network node 800 comprising it is operative, or configured, to perform said method and/or actions.

An Input/Output (I/O) module 805, configured to be involved in, e.g. by performing, any communication to and/or from other units and/or nodes, such as sending and/or receiving information to and/or from other external nodes or devices. The I/O module 805 may be exemplified by an obtaining, e.g. receiving, module and/or a sending module, when applicable.

The network node 800 may also comprise other exemplifying hardware and/or software module(s), which module (s) may be fully or partly implemented by the respective processing circuit. For example, the network node 800 may further comprise one or more of an obtaining module 806 and a sending module 807.

The network node 800 and/or the processing module 801 and/or the processing circuit 804 and/or the I/O module 805 and/or the obtaining module 806 are operative, or configured, to obtain the first parameter and/or the second parameter.

Further, the network node 800 and/or the processing module 801 and/or the processing circuit 804 and/or the I/O module 805 and/or the sending module 807 are operative, or configured, to send the obtained first parameter and/or the obtained second parameter to the network node 800.

Figure 9A:
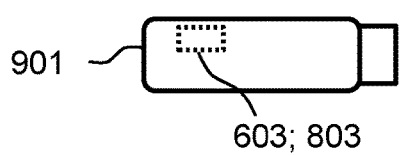
FIGS. 9a-c are schematic drawings illustrating embodiments relating to computer programs and computer readable media to cause the device and/or the network node to perform the first method and/or second method, respectively.
Figure 9B:
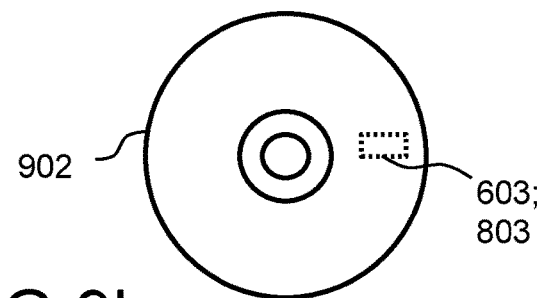
Figure 9C:
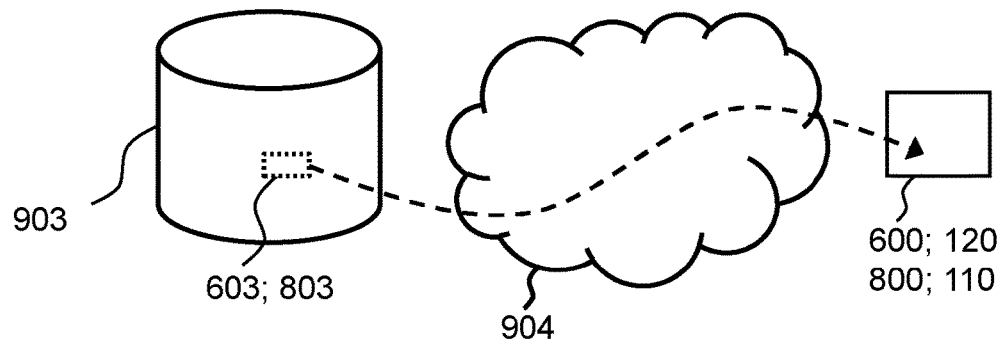

FIGS. 9a-c are schematic drawings illustrating embodiments relating to a computer program that may be any one of the computer programs 603 and 803, and that comprises instructions that when executed by the respective processing circuit 604, 804 causes the node, i.e. the device 600 or the network node 800, comprising it to perform the respective method as described above.

In some embodiments there is provided a computer program product, i.e. a data carrier, comprising a computer-readable medium and the computer program stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 901 as in FIG. 9a, a disc storage medium 902 such as a CD or DVD as in FIG. 9b, a mass storage device 903 as in FIG. 9c. The mass storage device 903 is typically based on hard drive(s) or Solid State Drive(s) (SSD). The mass storage device 903 may be such that is used for storing data accessible over a computer network 905, e.g. the Internet or a Local Area Network (LAN).

Each computer program 603, 803 may furthermore be provided as a pure computer program or comprised in a file or files. The file or files may be stored on the computer-readable medium and e.g. available through download e.g. over the computer network 905, such as from the mass storage device 903 via a server. The server may e.g. be a web or File Transfer Protocol (FTP) server. The file or files may e.g. be executable files for direct or indirect download to and execution on the node for carrying out the method, e.g. by the processing circuit, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self-Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "wireless device" as used herein, may as such refer to any type of wireless device arranged to communicate with a radio network node in a wireless, cellular and/or mobile communication system, such as the wireless communication network 100, and may thus be referred to as a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that with regard to the downlink, the term "transmitter" may be used herein to refer to a radio network node, e.g. base station, and the term "receiver" may refer to a wireless device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, etc., that may have been used herein, as such should be considering non-limiting and the terminology as such does not imply a certain hierarchical relation. Without any explicit information in the contrary, naming by enumeration should be considered merely a way of accomplishing different names.

The invention claimed is:

1. A method, performed by a device, for managing a retransmission on a Random Access Channel (RACH) in a wireless communication network, the method comprising:
performing the retransmission on the RACH, wherein the retransmission is based on a coverage class associated with the device, and wherein the retransmission is further based on a second time duration between successive occasions, separated in time, when retransmission on the RACH is allowed.

2. The method of claim 1, wherein the retransmission on the RACH is further based on a first time duration during which retransmission on the RACH is allowed.

3. The method of claim 2, wherein the first time duration is specified in terms of a first number of predefined time-frames.

4. The method of claim 2, wherein the first time duration is based on a first parameter and the coverage class.

5. The method of claim 2, further comprising: receiving, from a network node of the wireless communication network, at least one of a first parameter and a second parameter, wherein the first parameter is related to the first duration and the second parameter is related to the second duration.

6. The method of claim 1, wherein the second time duration is specified in terms of a second number of predefined time-frames.

7. The method of claim 1, wherein the second time duration is based on a second parameter and the coverage class.

8. A non-transitory, computer-readable medium storing computer-executable instructions that, when executed by at least one processor comprising a device, configures the device to perform operations corresponding to the method of claim 1.

9. A method, performed by a network node, for managing a retransmission made by a device on a Random Access Channel (RACH) in a wireless communication network comprising the network node, the method comprising:
obtaining at least one of:
a first parameter that, in association with a coverage class of the device, is usable to determine a first time duration during which retransmission on the RACH is allowed;
a second parameter that, in association with the coverage class of the device, is usable to determine a second time duration between successive occasions when retransmission on the RACH is allowed; and
sending the obtained at least one of the first parameter and the second parameter to the device.

10. A non-transitory, computer-readable medium storing computer-executable instructions that, when executed by at least one processor comprising a network node, configures the network node to perform operations corresponding to the method of claim 9.

11. A device configured to manage a retransmission on a Random Access Channel (RACH) in a wireless communication network comprising a network node, wherein the device comprises:
input/output circuitry configurable to communicate with the network node;
processing circuitry operatively coupled to the input/output circuitry; and at least one memory storing computer-executable instructions that, when executed by the processing circuitry, configures the device to:
perform the retransmission on the RACH, wherein the retransmission is based on a coverage class associated with the device, and wherein the retransmission is further based on a second time duration between successive occasions, separated in time, when retransmission on the RACH is allowed.

12. The device of claim 11, wherein the retransmission on the RACH is further based on a first time duration during which retransmission on the RACH is allowed.

13. The device of claim 12, wherein the first time duration is specified in terms of a first number of predefined time-frames.

14. The device of claim 12, wherein the first time duration is based on a first parameter and the coverage class.

15. The device of claim 12, wherein the device is further configured to:
receive, from a network node of the wireless communication network, at least one of a first parameter and a second parameter, wherein the first parameter is related to the first duration and the second parameter is related to the second duration.

16. The device of claim 11, wherein the second time duration is specified in terms of a second number of predefined time-frames.

17. The device of claim 11, wherein the second time duration is based on a second parameter and the coverage class.

18. A network node configured to manage a retransmission made by a device on a Random Access Channel (RACH) in a wireless communication network comprising the network node, wherein the network node comprises:
input/output circuitry configurable to communicate with the device;
processing circuitry operatively coupled to the input/output circuitry; and
at least one memory storing computer-executable instructions that, when executed by the processing circuitry, configures the network node to:
obtain at least one of:
a first parameter that, in association with a coverage class of the device, is usable to determine a first time duration during which retransmission on the RACH is allowed;
a second parameter that, in association with the coverage class of the device, is usable to determine a second time duration between successive occasions when retransmission on the RACH is allowed; and
send the obtained at least one of the first parameter and the second parameter to the device.

* * * * *